United States Patent
Hill, Jr.

(10) Patent No.: US 9,664,406 B2
(45) Date of Patent: May 30, 2017

(54) AIR EXCHANGE DEVICE FOR REFRIGERATED CHAMBER

(75) Inventor: Harold P. Hill, Jr., Jamesville, NY (US)

(73) Assignee: CARRIER CORPORATION, Farmington, CT (US)

( * ) Notice: Subject to any disclaimer, the term of this patent is extended or adjusted under 35 U.S.C. 154(b) by 113 days.

(21) Appl. No.: 13/981,174

(22) PCT Filed: Jan. 17, 2012

(86) PCT No.: PCT/US2012/021479
§ 371 (c)(1),
(2), (4) Date: Jul. 23, 2013

(87) PCT Pub. No.: WO2012/102894
PCT Pub. Date: Aug. 2, 2012

(65) Prior Publication Data
US 2013/0298592 A1  Nov. 14, 2013

Related U.S. Application Data

(60) Provisional application No. 61/435,526, filed on Jan. 24, 2011.

(51) Int. Cl.
*F25D 17/04* (2006.01)
*F24F 13/02* (2006.01)
(Continued)

(52) U.S. Cl.
CPC ......... *F24F 13/02* (2013.01); *B60H 1/00364* (2013.01); *B60H 1/26* (2013.01);
(Continued)

(58) Field of Classification Search
CPC ...... F24F 7/00; F24F 2007/005; F24F 13/065; F24F 13/0236; F24F 7/06; F24F 7/065;
(Continued)

(56) References Cited

U.S. PATENT DOCUMENTS

| 2,012,763 | A |   | 8/1935 | Kraft |
| 3,495,614 | A | * | 2/1970 | Guzman ................. C03B 5/237 137/311 |

(Continued)

FOREIGN PATENT DOCUMENTS

GB    191225429 A    3/1913

OTHER PUBLICATIONS

PCT International Preliminary Report on Patentability and Written Opinion of the International Searching Authority for International Application No. PCT/US2012/021479, Jul. 30, 2013, 6 pages.

*Primary Examiner* — Jianying Atkisson
*Assistant Examiner* — David Teitelbaum
(74) *Attorney, Agent, or Firm* — Cantor Colburn LLP (57) ABSTRACT

A refrigeration unit is provided for conditioning air within a refrigerated chamber for housing perishable goods having an improved air exchange device for selectively admitting fresh air into the refrigerated chamber while simultaneously venting air from within the refrigerated chamber. The air exchange device includes a tubular member having a first chamber and a second chamber isolated from first chamber, the first chamber having an inlet in flow communication with a fresh air source and an outlet opening in flow communication with the refrigerated chamber on a suction side of the evaporator, and the second chamber having an inlet in flow communication with the refrigerated chamber in a discharge side of evaporator fan and an outlet opening in flow communication with a space exterior of the refrigerated chamber.

9 Claims, 5 Drawing Sheets (51) Int. Cl.
*F24F 13/10* (2006.01)
*F24F 7/08* (2006.01)
*F24F 7/00* (2006.01)
*B60H 1/00* (2006.01)
*B60H 1/26* (2006.01)
*F24F 13/065* (2006.01)
*F24F 7/06* (2006.01)
*F24F 7/013* (2006.01)
*F24F 13/08* (2006.01)
*F24F 13/075* (2006.01)

(52) U.S. Cl.
CPC ............... *F24F 7/00* (2013.01); *F24F 7/08* (2013.01); *F24F 13/10* (2013.01); *F24F 7/013* (2013.01); *F24F 7/06* (2013.01); *F24F 7/065* (2013.01); *F24F 13/0236* (2013.01); *F24F 13/0281* (2013.01); *F24F 13/065* (2013.01); *F24F 13/075* (2013.01); *F24F 13/082* (2013.01)

(58) Field of Classification Search
CPC .... F24F 7/08; F24F 7/013; F24F 13/10; F24F 13/02; F24F 13/0281; F24F 13/075; F24F 13/082; F24F 2012/082
USPC .......... 62/407, 78; 454/234; 137/311, 616.7; 251/208
See application file for complete search history.

(56) References Cited

U.S. PATENT DOCUMENTS

| | | |
|---|---|---|
| 3,705,500 A | 12/1972 | Jehle |
| 4,102,357 A * | 7/1978 | Charlton ................. 137/625.32 |
| 4,448,112 A | 5/1984 | Soderberg |
| 4,744,409 A * | 5/1988 | Berner ............................. 165/4 |
| 4,845,958 A | 7/1989 | Senda et al. |
| 5,389,036 A | 2/1995 | Halley |
| 5,399,120 A * | 3/1995 | Burns et al. ................. 454/126 |
| 6,240,735 B1 * | 6/2001 | Kolson et al. ................. 62/187 |
| 6,471,136 B1 | 10/2002 | Chatterjee et al. |
| 6,763,677 B1 | 7/2004 | Burchill et al. |
| 6,928,830 B1 | 8/2005 | Simeone et al. |
| 6,945,071 B1 | 9/2005 | Simeone et al. |
| 7,089,751 B2 | 8/2006 | Fleming |
| 2005/0011218 A1 * | 1/2005 | Pearson et al. ................. 62/407 |
| 2006/0162577 A1 | 7/2006 | Jorgensen et al. |
| 2007/0065546 A1 | 3/2007 | Jorgensen et al. |
| 2008/0159910 A1 | 7/2008 | Dick et al. |
| 2009/0185948 A1 | 7/2009 | Jorgensen et al. |

* cited by examiner

AIR EXCHANGE DEVICE FOR REFRIGERATED CHAMBER

CROSS REFERENCE TO RELATED APPLICATION

This application claims priority to U.S. Provisional Patent Application Ser. No. 61/435,526 entitled "Air Exchange Device for Refrigerated Chamber" filed on Jan. 24, 2011. The content of this application is incorporated herein by reference in its entirety.

FIELD OF THE INVENTION

This invention relates generally to air exchange in connection with the preservation of perishable goods and, more particularly, to air exchange in connection with the preservation of perishable goods stowed in a refrigerated chamber. In a specific embodiment, the invention relates to a refrigeration unit operatively associated with the cargo box of a refrigerated transport container.

BACKGROUND OF THE INVENTION

Perishable goods are commonly transported in a controlled environment within an enclosed space such as a cargo box of a truck, trailer, container, or intermodal container. A refrigeration system, also known as a transport refrigeration system, is used in operative association with the enclosed space within the cargo box for controlling the temperature of the air within the enclosed space. The refrigeration system is operative to maintain the air temperature within the enclosed space within a desired temperature range selected for the particular type of perishable goods stowed within the cargo box. The refrigeration system includes a refrigeration unit including a refrigerant compressor and condenser disposed externally of the cargo box and an evaporator disposed within the enclosed space of the cargo box. The compressor, condenser and evaporator are connected in a refrigerant circuit in series refrigerant flow relationship in a refrigeration cycle. When the refrigeration system is operating, air is drawn from within the enclosed space, passed through an evaporator disposed within the enclosed space in heat exchange relationship with the refrigerant circulating through the refrigerant circuit to be cooled, and then supplied back to the enclosed space. Although typically operated in the cooling mode, the refrigerant unit may be equipped with means for heating the air passing through the evaporator in the event that the temperature within the enclosed space falls below the lower limit of the desired temperature range.

Certain perishable products, such as fresh fruits, vegetables and flowers, produce carbon dioxide as a product of the respiration process. In a closed environment, as the carbon dioxide concentration rises, the oxygen concentration drops. If the oxygen concentration gets too low or the carbon dioxide concentration gets too high, the produce can spoil. Additionally, certain fruits and vegetables and flowers release ethylene and/or ethylene compounds as a byproduct of the ripening process. The presence of ethylene based gases within the enclosed space of the cargo box is known to promote the ripening process.

To alleviate these conditions, it is known to introduce fresh air into the closed environment within the cargo box, as well as to vent air from the closed environment within the cargo box. For example, U.S. Pat. No. 6,763,677 discloses a manually operated fresh air vent associated with a refrigerated transport container for providing fresh air to the circulating air and exhausting a portion of the circulating air exteriorly of the cargo box of the container. The vent structure includes an assembly of a generally planar cover having a pair of diametrically opposed flow path openings and a planar cover door rotatable with respect to the cover and also having a pair of diametrically opposed flow path openings. When the door is rotated to bring the respective pairs of openings into alignment, two flow paths are opened, one through which fresh air is introduced into the circulating air and the other through which a portion of the circulating air is exhausted.

Another vent structure commonly used in connection with refrigeration systems commercially available from Carrier Corporation consists of a generally rectangular cover plate having a single opening therethrough that is disposed over and translatable with respect to a panel having a pair of spaced flow path openings. When the opening in the cover plate is positioned between the spaced openings in the panel therebeneath, both flow paths are closed. The cover plate is sized such that when the opening in the cover plate is translated into registration with one of the openings in the panel, both flow paths are opened, one through which fresh air is introduced into the circulating air and the other through which a portion of the circulating air is exhausted.

Although both of the aforementioned vent structures have performed well in service, the potential exists for exhausted air passing out of one opening being entrained in the fresh air being admitted through the other opening due to the close proximity of the pair of openings and the parallel alignment of the incoming fresh air flow and the discharging exhaust air flow. Therefore, it would be an improvement to provide an air exchange assembly structure having a reduced potential for entrainment of exhaust air into the incoming fresh air.

SUMMARY OF THE INVENTION

A refrigeration unit is provided for conditioning air within a refrigerated chamber for housing perishable goods having an improved air exchange device for selectively admitting fresh air into the refrigerated chamber while simultaneously venting air from within the refrigerated chamber.

The refrigeration unit includes an evaporator heat exchanger disposed in operative association with the refrigerated chamber, an evaporator fan for circulating a flow of air drawn from the refrigerated chamber through the evaporator heat exchanger and back into the refrigerated chamber, and an air exchange device. The air exchange device includes a tubular member having a first chamber and a second chamber isolated from first chamber. The first chamber has an inlet opening in flow communication with a fresh air source and an outlet opening in flow communication with the refrigerated chamber on a suction side of the evaporator fan. The second chamber having an inlet in flow communication with the refrigerated chamber on a discharge side of the evaporator fan and an outlet opening in flow communication with a space exterior of the refrigerated chamber.

The outlet of the first chamber may have a flow area that may be selectively adjusted from fully open to fully closed. The outlet of the second chamber may have a flow area that may be selectively adjusted from fully open to fully closed. In an embodiment of the air exchange device, the outlet of the first chamber has a flow area that may be selectively adjusted from fully open to fully closed, the outlet of the second chamber has a flow area that may be selectively adjusted from fully open to fully closed, and the adjustment of the flow area of the outlet of the first chamber and the adjustment of the flow area of the outlet of the second chamber are coordinated whereby the flow area of the outlet of the first chamber and the flow area of the outlet of the second chamber are simultaneously open or simultaneously closed.

The air exchange device may further include a housing disposed about the tubular member, the housing having a first opening communicating with the suction side of the refrigerated chamber and a second opening communicating to the space exterior of the refrigerated chamber. The tubular member may be disposed for rotation within and relative to the housing and be selectively rotatable within the housing between a first position relative to the housing whereat the outlet of the first chamber of the tubular member is juxtaposed in full registration with the first opening of the housing and the outlet of the second chamber of the tubular member is juxtaposed in full registration with the second opening of the housing, and a second position relative to the housing whereat the outlet of the first chamber of the tubular member is juxtaposed out of registration with the first opening of the housing and the outlet of the second chamber of the tubular member is juxtaposed out of registration with the second opening of the housing. The tubular member may be selectively rotatable within the housing to be positioned at at least one position between the first position and the second position whereat the outlet of the first chamber of the tubular member is juxtaposed in partial registration with the first opening of the housing and the outlet of the second chamber of the tubular member is juxtaposed in partial registration with the second opening of the housing.

The air exchange device may further include a seal member disposed intermediate the tubular member and the housing. The seal member may also comprise a bearing member. A drive motor may be operatively associated with the tubular member for rotating the tubular member relative to the housing.

BRIEF DESCRIPTION OF THE DRAWINGS

For a further understanding of the disclosure, reference will be made to the following detailed description which is to be read in connection with the accompanying drawing, wherein.

DETAILED DESCRIPTION OF THE INVENTION

Figure 1:
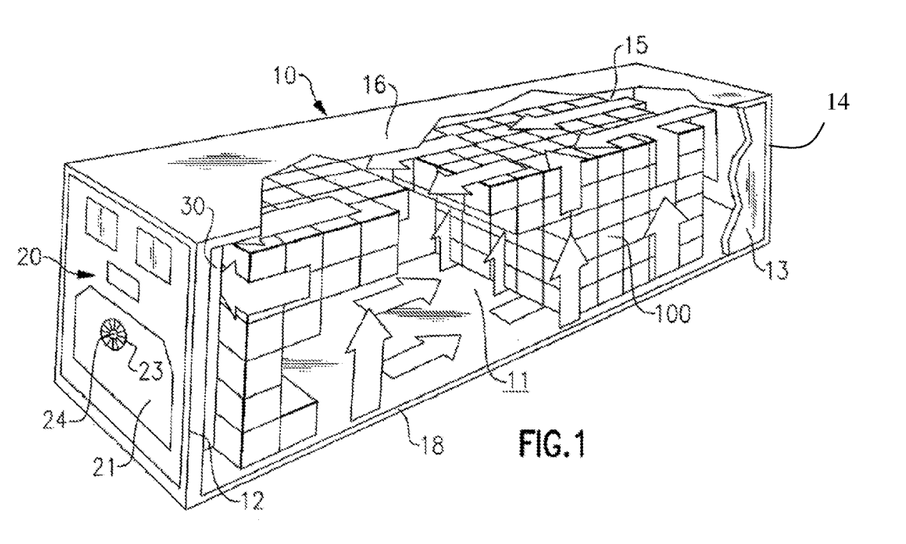
FIG. 1 is a perspective view of a refrigerated transport container, equipped with a refrigeration unit, with a portion of the side wall and ceiling removed.

Referring initially to FIG. 1 of the drawing, there is depicted an exemplary embodiment of a refrigerated cargo container, generally referenced 10. The cargo container 10 has a box-like structure formed of a forward or front wall 12, a back or rear wall 14, a pair of opposed sidewalls 13 and 15, a ceiling 16 and a floor 18. The box-like structure defines a cargo space 11 in which the bins, cartons or pallets of cargo 100 being transported are stacked on the floor 18. The rear wall 14 is provided with one or more doors (not shown) through which access to the cargo space may be had for loading the cargo 18 into the container 10. When the doors are closed, a substantially air-tight, sealed cargo space is established within the container 10 which prevents inside air from escaping the cargo space 11.

Figure 2:
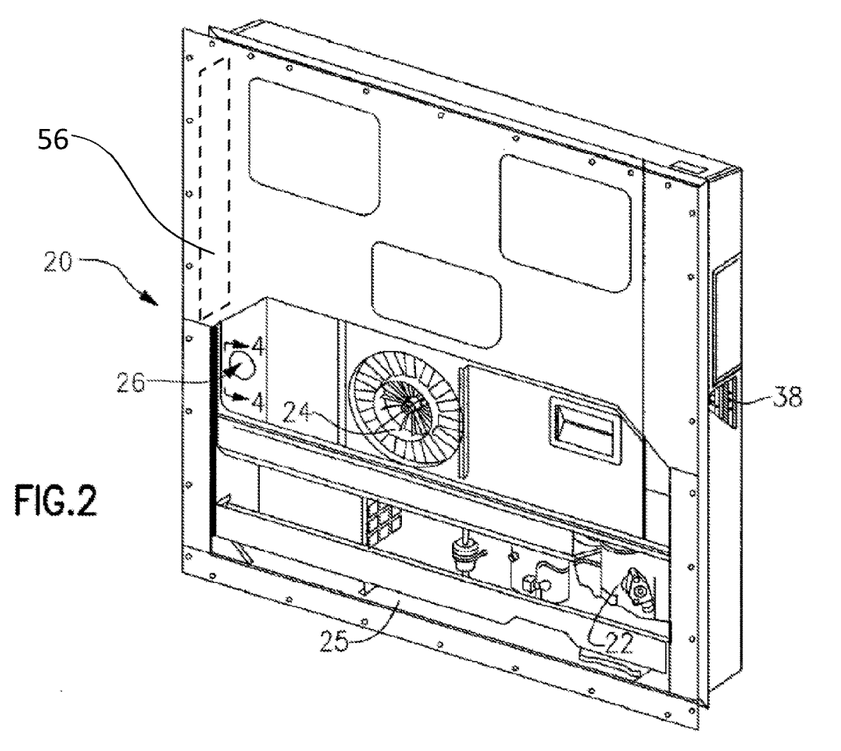
FIG. 2 is a perspective view of the front of the refrigeration unit mounted to the forward wall of the container of FIG. 1.

A refrigeration unit 20 is mounted to a wall of the container 10. Generally, the refrigeration unit 20 is received in an opening in the forward wall 12 of the container 10 and mounted around its perimeter to the forward wall 12 of the container 10, for example as depicted in FIG. 1, for conditioning the air within the refrigerated chamber 11, i.e. the cargo space of the container 10. Referring now to FIG. 2 also, the refrigeration unit 20 includes a compressor 22 with an associated compressor drive motor and a condenser/gas cooler module (not shown) isolated from the cargo space 11, and an evaporator module operatively associated with the cargo space 11 defined within the container 10. The condenser/gas cooler module includes a refrigerant heat rejection heat exchanger (not shown) mounted in the forward section of the refrigeration unit 20 external to the cargo space 11 and positioned generally behind the condenser fan 24. The condenser fan 24 draws ambient outdoor air through an opening 25 at the lower front of the refrigeration unit 20, thence passes that air through the condenser/gas cooler heat exchanger behind the front panel 21 and discharges that air back into the outdoor environment.

An air exchange device 26 is provided for admitting fresh outdoor air into the cargo space 11 of the container 10, for example into the air flow circulating through the evaporator module 30 on the suction side of the evaporator module, and simultaneously venting stale air from within the cargo space 11 of the container 10, for example from the air flow having traversed the evaporator module 30. The air exchange device 26 is disposed at its forward end to open through the front panel 21 and extend reardwardly to open at its aft end into the cargo space 11 of the container 10. The fresh air may be atmospheric air drawn directly from the environment exterior of the cargo space 11 of the container 10. The vented air refers to stale air from within the cargo space 11, which typically has elevated concentrations of off- gases from the produce within the cargo space 11, such as ethylene and/or ethylene based gases and/or carbon dioxide.

Figure 3:
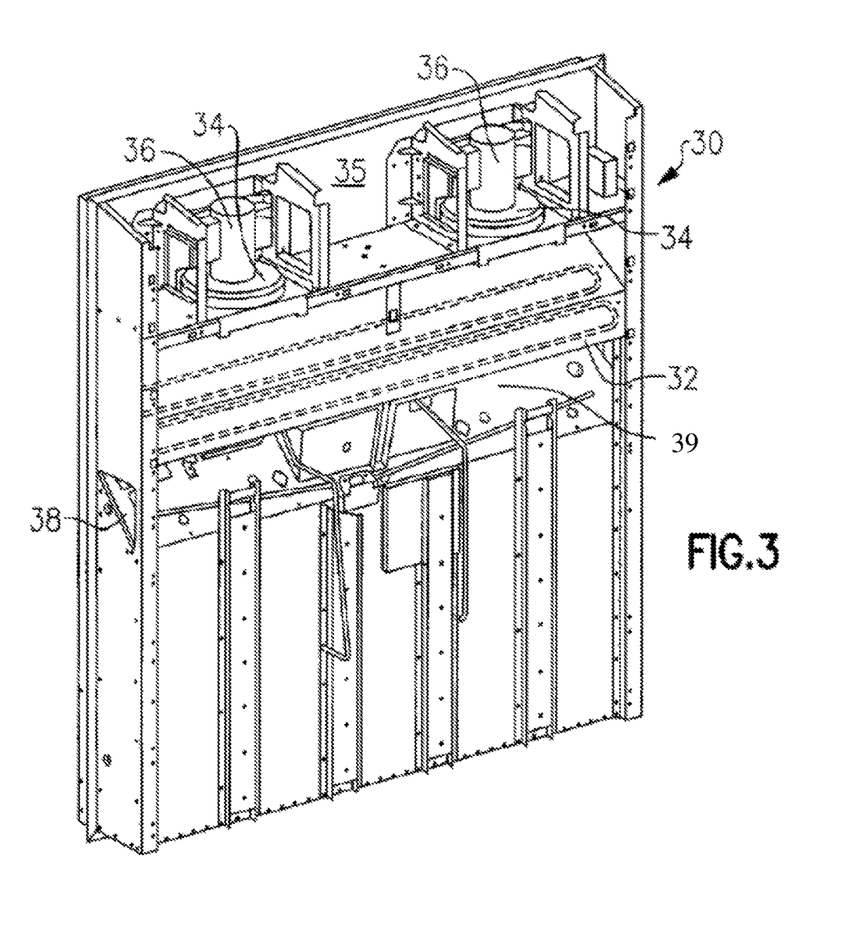
FIG. 3 is a perspective view of the evaporator face of the refrigeration unit mounted to the forward wall of the container of FIG. 1 looking forward from within the cargo space defined within the container.

Referring now to FIG. 3 in particular, the evaporator module 30 includes a refrigerant heat absorption heat exchanger 32 and one or more evaporator fans 34 with associated fan motors 36, for example two evaporator fans 34 disposed behind fan access panels 38 (see FIG. 2), disposed within the confines of the container 10. The evaporator fans 34 draw return air from the cargo space 11 into a return air plenum 35 defined within the confines of the container 10 along an upper region of the forward wall 12 and open to the cargo space 11 of the container 10. The evaporator fans 34 pass the return air, and any fresh outdoor air that may be admitted through the air exchange device 26 and mixed therewith in the return air plenum 35, downwardly through the evaporator heat exchanger 32 for temperature conditioning and deliver that conditioned air as supply air back into the cargo space 11 defined within the container 10 through outlets 39. Although the refrigeration unit 20 is typically operated in the cooling mode to reduce the temperature of the return air, the refrigeration unit 20 may be equipped with an auxiliary air heating device (not shown) for heating the return air when the container 10 is in transit in a region having an environment wherein the ambient outdoor temperature is below the desired cargo transport temperature.

Figure 4:
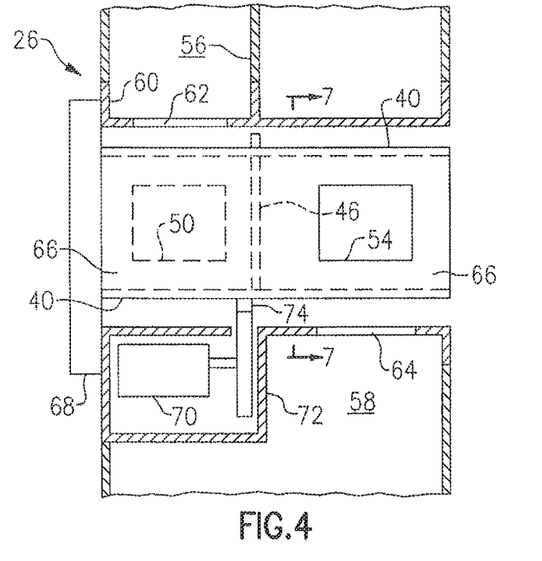
FIG. 4 is a side elevation view, partly in section, of the refrigeration unit taken generally along line 4-4 of FIG. 2.
Figure 5:
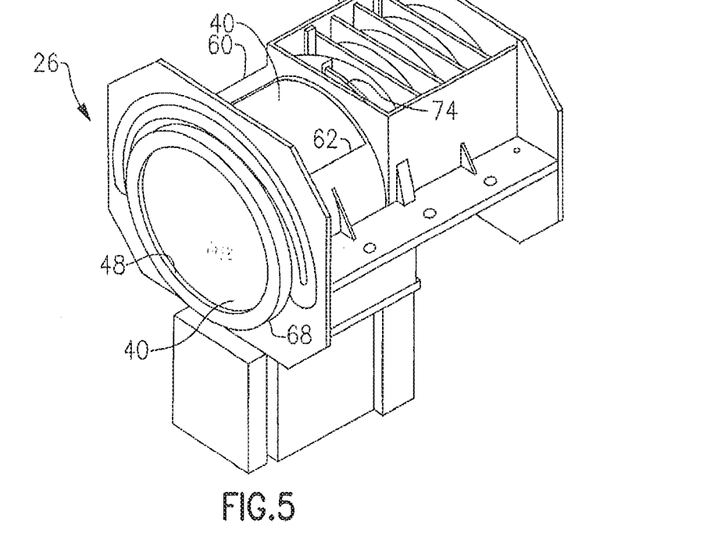
FIG. 5 is a perspective view of an exemplary embodiment of the air exchange device disclosed herein.
Figure 6:
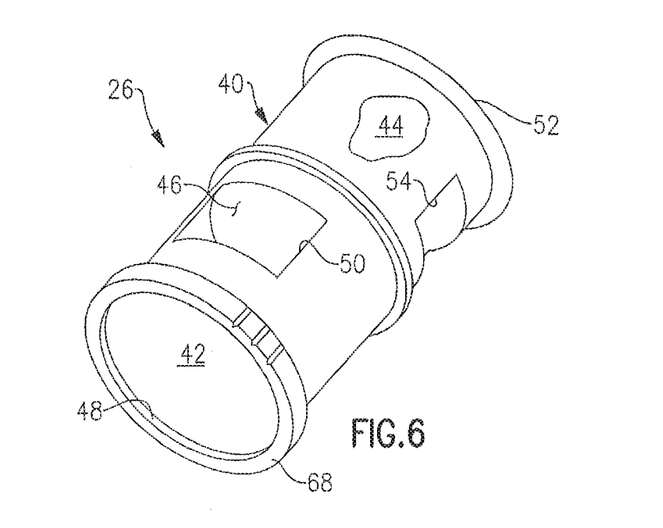
FIG. 6 is a perspective view of an exemplary embodiment of the tubular member of the air exchange device disclosed herein.

Referring now to FIGS. 4, 5 and 6, the air exchange device 26 includes a tubular member 40 having a first chamber 42 and a second chamber 44. The interior volume defined by the tubular member 40 is divided into the first chamber 42 and the second chamber 44 by a flow impervious division wall 46, whereby the first chamber 42 and second chamber 44 are isolated from each other. The first chamber 42 has an inlet 48 opening at the forward end of the tubular member 40 in flow communication with a fresh air source and an outlet 50 selectively registrable in flow communication with the return air plenum, which is open to the refrigerated cargo space 11 of the container 10 on a suction side of the evaporator(s) 34. The second chamber 44 has an inlet 52 opening at the aft end 43 of the tubular member 40 in flow communication with the refrigerated cargo space 11 on a discharge side of evaporator fan and an outlet 54 selectively registrable in flow communication with a space exterior of the refrigerated cargo space 11 of the container 10.

The outlet 50 of the first chamber 42 of the tubular member 40 may have a flow area that may be selectively adjusted from fully open to fully closed. Similarly, the outlet 54 of the second chamber 44 of the tubular member 40 may have a flow area that may be selectively adjusted from fully open to fully closed. The adjustment of the flow area of the outlet 48 of the first chamber 42 and the adjustment of the flow area of the outlet 54 of the second chamber 44 are coordinated whereby the flow area of the outlet 48 of the first chamber 42 and the flow area of the outlet 54 of the second chamber 44 are simultaneously open and simultaneously closed. Thus, when the outlet 48 of the first chamber 42 and the outlet 54 of the second chamber 44 are both open, air exchange occurs with air from within the refrigerated cargo box being vented to the exterior of the container 10 and replaced by fresh air. In the exemplary embodiment depicted in FIGS. 4-6, the incoming fresh air is drawn from the ambient atmosphere exterior of the container 10 through inlet 48 to the first chamber 42 of the tubular member 40 and thence the outlet 50 of the first chamber 42 into and through the duct 56 into the return air plenum 35 on the suction side of the evaporator fan(s) 34. The air from within the container 10 is vented to the atmosphere, passing from the supply air path 58 on the discharge side of the evaporator fan(s) 34 through the inlet 52 into the second chamber 44 of the tubular member 40 and thence through the outlet 54 of the second chamber 44, for example into the ambient air flow passing through the condenser/gas cooler heat exchanger of the refrigeration unit 20. When the outlet 50 of the first chamber 42 and the outlet 54 of the second chamber 44 are closed, no air exchange occurs.

Referring now to FIGS. 4 and 5, in particular, the air exchange device 26 further includes a housing 60 that receives the tubular member 40. The housing 60 has a first opening 62 communicating with the return air plenum 35 on the suction side of the evaporator fan(s) 34 by way of the duct 56 and a second opening 64 communicating to the space exterior of the refrigerated cargo space 11. The tubular member 40 is received into the housing 60 and disposed for rotation within and relative to the housing 60. The tubular member 40 may be selectively rotatable about its longitudinal axis within the housing 60 between a first position relative to the housing 60 whereat the outlet 50 of the first chamber 42 of the tubular member 40 is juxtaposed in full registration with the first opening 62 in the housing 60 and the outlet 54 of the second chamber 44 of the tubular member 40 is juxtaposed in full registration with the second opening 64 in the housing 60, and a second position relative to the housing 60 whereat the outlet 50 of the first chamber 42 of the tubular member 40 is positioned completely out of registration with the first opening 62 in the housing 60 and the outlet 54 of the second chamber 44 of the tubular member is positioned completely out of registration with the second opening of the housing. Additionally, the tubular member 40 may be selectively rotatable within the housing 60 to be positioned at at least one additional position between the first position and the second position whereat the outlet 50 of the first chamber 42 of the tubular member 40 is juxtaposed in partial registration with the first opening 62 in the housing 60 and the outlet 54 of the second chamber 44 of the tubular member 40 is juxtaposed in partial registration with the second opening 64 of the housing 60.

Figure 7:
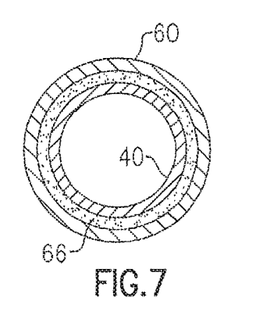
FIG. 7 is a sectioned elevation view taken generally along line 7-7 of FIG. 4.

Referring now to FIG. 7 also, a seal member 66 is disposed about the tubular member 40 intermediate and in contact with the outer surface of the tubular 40 and the facing surface of the housing 60 in which the tubular member 40 is disposed. The seal member 66 may be comprised of a material having a density and elasticity sufficient to prevent airflow between the outer surface of the tubular member 40 and the facing surface of the housing 60. The seal member 66 may also be comprised of a material that not only has a density and elasticity sufficient to prevent airflow between the outer surface of the tubular member 40 and the facing surface of the housing 60, but also has a low friction characteristic whereby the seal member 66 comprises both a seal member and a bearing member. The seal member 66 may molded onto or adhesively bounded to the outer surface of the tubular member.

The tubular member 40 may be selectively positioned in a fully open, partially open or fully closed position by manually grasping the forward rim 68 on the tubular member 40 and rotating the rim 68, which may be knurled or otherwise configured to facilitate grasping, clockwise or counter-clockwise about the longitudinal axis of the tubular member 40 as appropriate to selectively position the tubular member 40 relative to the housing 60. However, if desired, a motor may be provided in operative association with the tubular member 40 for driving the tubular member 40 about its longitudinal axis under the control of a controller, for example the refrigeration unit controller. For example, an electric motor 70 may be disposed in a lower compartment 72 of the housing 60 beneath and in operative association with the tubular member 40. The drive mechanism (not shown) of the motor 70 may, for example, be drivingly connected with a ring gear 74 on the tubular member 40.

As noted previously, in prior art fresh air exchange systems, the potential exists for vented air passing out of one opening being entrained in the fresh air being admitted through the other opening due to the close proximity of the pair of openings and the parallel alignment of the incoming fresh air flow and the discharging vented air flow. In the fresh air exchange system disclosed herein, the ingestion of the vented air discharging from the outlet 54 of the second chamber 44 of the tubular member 40 of the air exchange device 26 into the fresh air flow entering the first chamber 42 of the air exchange device 26 through the inlet 46 is eliminated. First, the outlet 54 of the second chamber 44 is arranged generally orthogonal to the inlet 46 to the first chamber 42 whereby the vented air flow discharging from the outlet 54 is discharged generally orthogonally to, rather than parallel to, the fresh air flow entering through the inlet 46. Additionally, vented air flow may be discharged into the ambient air stream passing over the condenser/gas cooler heat exchanger disposed behind the front panel of the refrigeration unit and carried in that air stream out into the atmosphere through the condenser fan discharge opening, which may be located at least a couple of feet away from the location at which the air exchange device 26 opens to the atmosphere through the front panel.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

We claim:

1. A refrigeration unit for conditioning air within a refrigerated chamber for housing perishable goods, the refrigeration unit comprising:
    an evaporator heat exchanger disposed in operative association with the refrigerated chamber;
    an evaporator fan for circulating a flow of air drawn from the refrigerated chamber through the evaporator heat exchanger and back into the refrigerated chamber, the evaporator fan having a suction side and a discharge side; and
    an air exchange device including a single tubular member, an interior volume of the single tubular member divided into a first chamber and a second chamber isolated from first chamber by a flow impervious division wall within the single tubular member, the first chamber having a first inlet in flow communication with a fresh air source and first outlet in flow communication with the refrigerated chamber on the suction side of the evaporator fan, and the second chamber having a second inlet in flow communication with the refrigerated chamber in the discharge side of the evaporator fan and a second outlet in flow communication with a space exterior of the refrigerated chamber;
    wherein the air exchange device further includes a housing disposed about the tubular member, the housing having a first housing opening communicating with the suction side of the refrigerated chamber and a second housing opening communicating to the space exterior of the refrigerated chamber, the tubular member disposed for rotation within and relative to the housing to adjust registration of the first outlet with the first housing opening and the second outlet with the second housing opening;
    wherein the second outlet of the second chamber of the tubular member is disposed orthogonally to the first inlet of the first chamber of the tubular member.

2. The refrigeration unit as set forth in claim 1 wherein the first outlet of the first chamber has a first flow area selectively adjustable from fully open to fully closed.

3. The refrigeration unit as set forth in claim 1 wherein the second outlet of the second chamber has a second flow area selectively adjustable from fully open to fully closed.

4. The refrigeration unit as set forth in claim 1 wherein:
    the first outlet of the first chamber has a first flow area selectively adjustable from fully open to fully closed;
    the second outlet of the second chamber has a second flow area selectively adjustable from fully open to fully closed; and
    the adjustment of the first flow area of the first outlet of the first chamber and the adjustment of the second flow area of the second outlet of the second chamber are coordinated whereby the first flow area of the first outlet of the first chamber and the second flow area of the second outlet of the second chamber are simultaneously open and simultaneously closed.

5. The refrigeration unit as set forth in claim 1 wherein the tubular member is selectively rotatable within the housing between a first position relative to the housing whereat the first outlet of the first chamber of the tubular member is juxtaposed in full registration with the first housing opening of the housing and the second outlet of the second chamber of the tubular member is juxtaposed in full registration with the second housing opening of the housing, and a second position relative to the housing whereat the first outlet of the first chamber of the tubular member is juxtaposed out of registration with the first housing opening of the housing and the second outlet of the second chamber of the tubular member is juxtaposed out of registration with the second housing opening of the housing.

6. The refrigeration unit as set forth in claim 5 wherein the tubular member is selectively rotatable within the housing to be positioned in at least one position between the first position and the second position whereat the first outlet of the first chamber of the tubular member is juxtaposed in partial registration with the first housing opening of the housing and the second outlet of the second chamber of the tubular member is juxtaposed in partial registration with the second housing opening of the housing.

7. The refrigeration unit as set forth in claim 1 further comprising a seal member disposed intermediate the tubular member and the housing.

8. The refrigeration unit as set forth in claim 7 wherein the sealing member also comprises a bearing member.

9. The refrigeration unit as set forth in claim 1 further comprising a drive motor operatively associated with the tubular member for rotating the tubular member relative to the housing.

* * * * *